(12) United States Patent
Qian

(10) Patent No.: US 11,954,133 B2
(45) Date of Patent: Apr. 9, 2024

(54) METHOD AND APPARATUS FOR MANAGING AND CONTROLLING RESOURCE, DEVICE AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventor: Cunfeng Qian, Shanghai (CN)

( * ) Notice: Subject to any disclaimer, the term of this patent is extended or adjusted under 35 U.S.C. 154(b) by 0 days.

(21) Appl. No.: 17/793,812

(22) PCT Filed: Jan. 15, 2021

(86) PCT No.: PCT/SG2021/050027
§ 371 (c)(1),
(2) Date: Jul. 19, 2022

(87) PCT Pub. No.: WO2021/150165
PCT Pub. Date: Jul. 29, 2021

(65) Prior Publication Data
US 2023/0144100 A1    May 11, 2023

(30) Foreign Application Priority Data
Jan. 20, 2020    (CN) .......................... 202010066236.0

(51) Int. Cl.
*G06F 16/00*        (2019.01)
*G06F 16/25*        (2019.01)
*G06F 16/28*        (2019.01)

(52) U.S. Cl.
CPC .......... *G06F 16/285* (2019.01); *G06F 16/258* (2019.01)

(58) Field of Classification Search
CPC .... G06F 16/285; G06F 16/258; G06F 16/907; G06F 16/24568; G06F 16/2365; G06F 16/244; G06F 16/24573; G06F 16/284
See application file for complete search history.

(56) References Cited

U.S. PATENT DOCUMENTS 6,684,207 B1 *  1/2004  Greenfield .......... G06F 16/2452
10,169,486 B2    1/2019  Park et al.
(Continued)

FOREIGN PATENT DOCUMENTS

CN    106776967 A    5/2017
CN    107491458 A    12/2017
(Continued)

OTHER PUBLICATIONS

Examination Report No. 1 for Australian application No. 2021210357 dated Mar. 1, 2023, 3p.
(Continued)

*Primary Examiner* — Dinku W Gebresenbet
(74) *Attorney, Agent, or Firm* — Crowell & Moring LLP; John C. Freeman

(57) ABSTRACT

A method and apparatus for managing and controlling a resource based on a time series database. The method includes: acquiring metadata of a resource; aggregating the metadata according to an aggregation strategy to obtain aggregated metadata; and managing and controlling the resource in the time series database based on the aggregated metadata. The aggregated metadata may be multiple data sets, each of which may be a type of metadata, so that massive metadata may be aggregated into the multiple sets, thereby realizing categorized storage of the metadata. In addition, the method for managing and controlling the resource is applied to the time series database.

8 Claims, 5 Drawing Sheets

(56) References Cited

U.S. PATENT DOCUMENTS

| | | | |
|---|---|---|---|
| 11,226,964 B1* | 1/2022 | Cairney | G06F 16/2379 |
| 2017/0163565 A1 | 6/2017 | Moran, Jr. | |
| 2017/0185639 A1 | 6/2017 | Valine et al. | |
| 2018/0004812 A1 | 1/2018 | Shawver et al. | |
| 2018/0131761 A1 | 5/2018 | Taylor et al. | |
| 2020/0136927 A1* | 4/2020 | Dondemadhahalli | ............... H04L 47/822 |
| 2021/0089518 A1* | 3/2021 | Beedgen | G06F 16/258 |
| 2022/0398243 A1* | 12/2022 | Beedgen | G06F 16/258 |

FOREIGN PATENT DOCUMENTS

| | | |
|---|---|---|
| CN | 108664603 A | 10/2018 |
| EP | 3588222 A1 | 1/2020 |
| JP | 2007-531091 A | 11/2007 |
| JP | 2017535012 A * | 11/2017 |

OTHER PUBLICATIONS

Extended European Search Report for European application No. 21744079.1 dated Feb. 8, 2023, 14p.

Notice of Reasons for Refusal for Japanese application No. 2022-554173 dated Jan. 27, 2023, which includes English language translation (2 of 5 pages).

Substantive Examination Adverse Report (4 pages) dated Dec. 30, 2022 issued by the Intellectual Property Corporation of Malaysia out of corresponding Malaysian Patent Application No. PI2022003820.

Notice of Preliminary Rejection (10 pages) issued by the Korean Intellectual Property Office dated Dec. 1, 2022 out of corresponding Korean patent Application No. 10-2022-7028156.

International Search Report dated May 10, 2021 (4 English pages) out of PCT Priority Application PCT/SG2021/050027.

Written Opinion dated May 10, 2021 (5 English pages) out of PCT Priority Application PCT/SG2021/050027.

International Preliminary Report on Patentability dated Jan. 12, 2022 (5 English pages) out of PCT Priority Application PCT/SG2021/050027.

Notice of Decision to Grant a Patent (5 pages) dated Jul. 24, 2023 out of corresponding Japanese Patent Application No. 2022-554173.

Decision of Patent dated Apr. 25, 2023 (3 pages) out of corresponding Korean Patent Application No. 10-2022-7028156.

Substantive Examination Clear Report (1 page) dated May 31, 2023 out of corresponding Malaysian Patent Application No. PI2022003820.

* cited by examiner

METHOD AND APPARATUS FOR MANAGING AND CONTROLLING RESOURCE, DEVICE AND STORAGE MEDIUM

This application is a national application based on Patent Cooperation Treaty Patent Application No. PCT/SG2021/050027, filed on Jan. 15, 2021, the entire contents of which are incorporated herein by reference.

This application claims under 35 U.S.C. § 119(a) the benefit of the filing date of Chinese Patent Application No. 202010066236.0, filed on Jan. 20, 2020, the entire contents of which are incorporated herein by reference.

BACKGROUND OF THE INVENTION

Field of Invention

The embodiments of the present disclosure relate to the field of computer and Internet of Things technologies, and in particular, relate to a method and an apparatus for managing and controlling a resource based on a time series database, a device, and a storage medium.

Description of Related Art

With the rapid development of hybrid clouds, there are more and more scenarios for enterprises to use hybrid clouds. As massive data is managed in hybrid clouds in real time by enterprises, while hybrid clouds are widely used by enterprises, challenges are also brought to resource management in hybrid clouds.

In related technologies, traditional resource management is adopted for the resource management of hybrid clouds, in which relational databases are mainly used, and relational databases store data in specific format and with complete content uploaded by enterprises. The purpose of traditional resource management to develop a relational database is to process permanent and stable data.

In the traditional resource management, the relational database emphasizes maintaining the integrity and consistency of data, so it is difficult to process the data differently according to the individual needs of enterprises.

SUMMARY

The embodiments of the present disclosure provide a method and an apparatus for managing and controlling a resource based on a time series database, a device, and a storage medium, which may be used to solve the technical problem that the relational database in related technologies emphasizes maintaining the integrity and consistency of data, and thus it is difficult to process the data differently according to the individual needs of enterprises. The technical solutions are as follows.

In one aspect, a method for managing and controlling a resource based on a time series database is provided by an embodiment of the present disclosure, and the method includes:

acquiring metadata of the resource, the metadata referring to an acquisition metric of the resource;

aggregating the metadata according to an aggregation strategy to obtain aggregated metadata, the aggregation strategy being configured to aggregate the metadata based on a data metric of the metadata; and managing and controlling the resource in the time series database based on the aggregated metadata.

In another aspect, an apparatus for managing and controlling a resource based on a time series database is provided by an embodiment of the present disclosure, and the apparatus includes:

a data acquiring module, configured to acquire metadata of the resource, the metadata referring to an acquisition metric of the resource;

an aggregating module, configured to aggregate the metadata according to an aggregation strategy to obtain aggregated metadata, the aggregation strategy being configured to aggregate the metadata based on a data metric of the metadata; and a resource managing and controlling module, configured to manage and control the resource in the time series database based on the aggregated metadata.

In yet another aspect, a computer device is provided by an embodiment of the present disclosure, wherein the computer device includes a processor and a memory, wherein the memory stores therein a computer program that, when loaded and executed by the processor, causes the processor to implement the method for managing and controlling the resource based on the time series database.

In still another aspect, a non-transitory computer-readable storage medium is provided by an embodiment of the present disclosure, wherein the non-transitory computer-readable storage medium stores thereon a computer program, wherein the computer program, when executed by a processor, causes the processor to implement the method for managing and controlling the resource based on the time series database.

In still yet another aspect, a computer program product is provided by an embodiment of the present disclosure, wherein the computer program product, when executed by a processor, is configured to cause the processor to implement the method for managing and controlling the resource based on the time series database.

The technical solution provided by the embodiments of the present disclosure provides a method for managing and controlling a resource based on a time series database by acquiring metadata of the resource, and then aggregating the metadata according to an aggregation strategy to obtain the aggregated metadata, and further managing and controlling the resource in the time series database based on the aggregated metadata. Moreover, in the embodiments of the present disclosure, the aggregated metadata may be multiple data sets, each of which may be a type of metadata, so that massive metadata may be aggregated into the multiple sets by aggregating the metadata in the embodiments of the present disclosure, thereby realizing categorized storage of the metadata, and facilitating a quick retrieval of required metadata for analyzing and processing. In addition, in the embodiments of the present disclosure, the method for managing and controlling the resource is applied to the time series database. Due to the fact that the time series database itself has the characteristics of high storage efficiency and strong portability, the efficiency of managing and controlling resources is improved, and the resources may also be managed differently to meet different needs.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description are merely some embodiments of the present disclosure, and a person of ordinary skill in the art may also derive other drawings from these accompanying drawings without creative efforts.

DETAILED DESCRIPTION

For clearer descriptions of the objects, technical solutions and advantages in the present disclosure, the implementation of the present disclosure is described in detail below in combination with the accompanying drawings.

Figure 1:
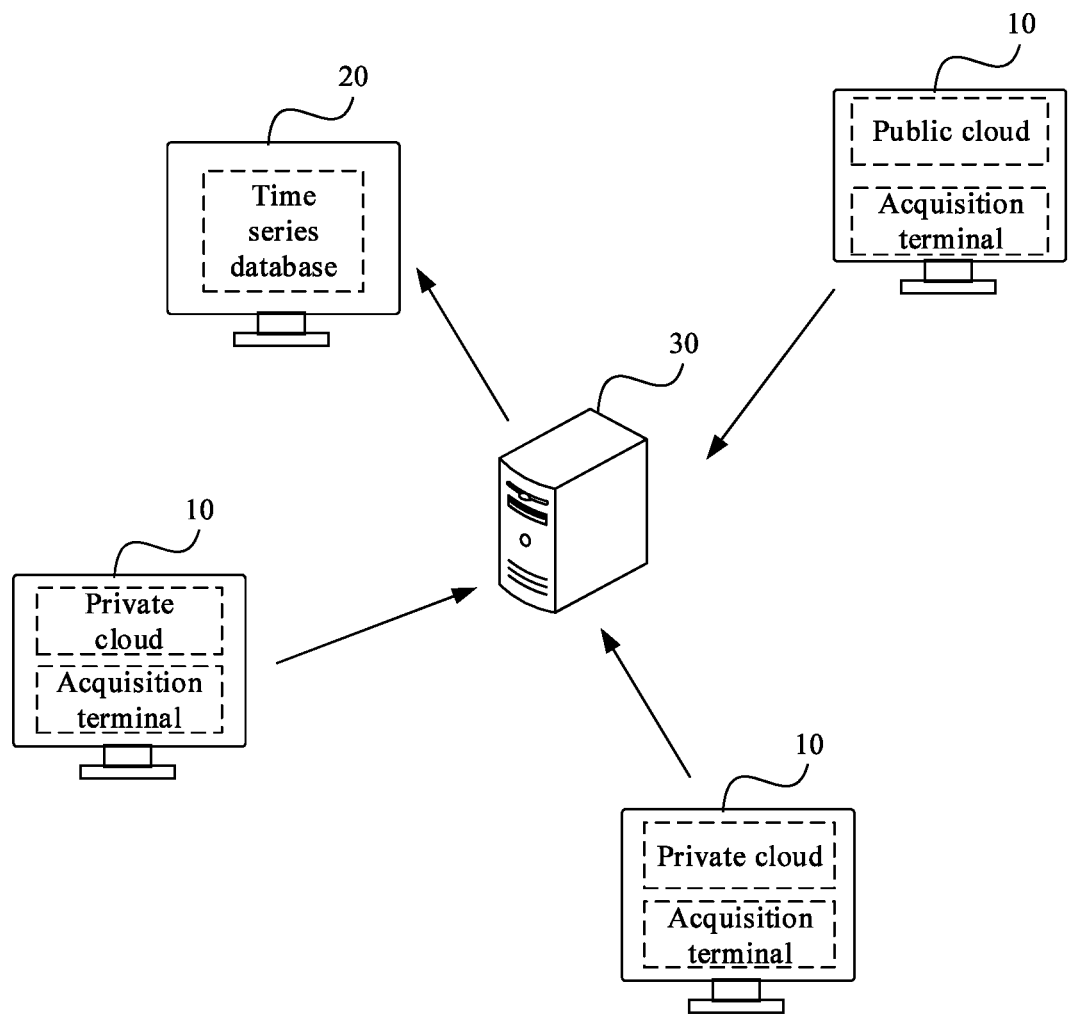
FIG. 1 is a schematic diagram of an implementation environment according to an embodiment of the present disclosure.

Please refer to FIG. 1 which shows a schematic diagram of an implementation environment involved in an embodiment of the present disclosure. The implementation environment may include: a computer device 10 for acquisition and a computer device 20 for processing.

The computer device refers to a device which has data acquiring and data processing functions, such as a server having a computing capability, a terminal such as a mobile phone, a tablet, a multimedia playback device, a wearable device and the like, or other computer device. Optionally, when the computer device is a server, the computer device may be a server, a server cluster composed of multiple servers, or a cloud computing service center.

The computer device 10 for acquisition has a data acquiring function, and can acquire resources based on preset acquiring metrics so as to obtain metadata. Optionally, the computer device 10 for acquisition may acquire metadata not only on software and hardware of its own, but also on external hardware devices, which is not limited in the embodiments of the present disclosure. For example, the computer device 10 for acquisition may acquire metadata on performance of a central processor, and may also acquire metadata on performances of various hardware devices, such as a network device, a firewall, a router, and the like. Optionally, multiple computer devices 10 for acquisition may be used in order to acquire time series data on different regions, different locations and different devices. Optionally, an acquisition terminal is mounted in the computer device 10 for acquisition, and the acquisition terminal is configured to acquire metadata. In the embodiments of the present disclosure, the acquisition terminal may not only acquire metadata in a public cloud, but may also acquire metadata in a private cloud, that is, the acquisition terminal may acquire metadata in hybrid clouds. In the embodiments of the present disclosure, the computer device 10 for acquisition may send acquired metadata to the server 30, and then the server 30 may send the metadata to the computer device 20 for processing; the computer device 10 for acquisition may also directly send the metadata to the computer device 20 for processing. FIG. 1 is illustrated only by taking the computer device 10 for acquisition firstly sending the metadata to the server 30 as an example.

The computer device 20 for processing has a data processing function, and can perform a variety of processing on the metadata to manage and control resources. Optionally, the computer device 20 for processing may perform processing, such as format conversion, information extension, data aggregation, and the like, on the metadata, which is not limited in the embodiments of the present disclosure. Optionally, there is a time series database running in the computer device 20 for processing, and the time series database may store and analyze the acquired metadata. A time series database is a database that stores time-related data, that is, a database that stores time series data. The time series database itself has the characteristics of high storage efficiency and strong portability. It may write a large amount of data in real-time, and may use various strategies, such as a data aggregation strategy, to process the data, so as to meet individual needs of enterprises.

In the embodiments of the present disclosure, the computer device 10 for acquisition and the computer device 20 for processing may communicate with each other via a network. The network may be a wired network or a wireless network. Exemplarily, the computer device 10 for acquisition may send the acquired metadata to the computer device 20 for processing via the network, and then the computer device 20 for processing analyzes and processes the metadata to complete management and control of the resources.

Figure 2:
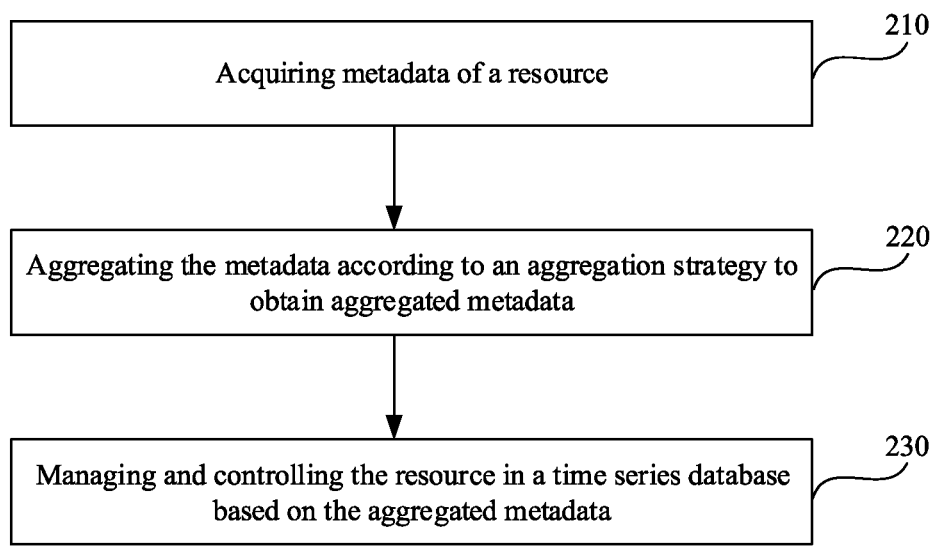
FIG. 2 is a flowchart of a method for managing and controlling a resource based on a time series database according to an embodiment of the present disclosure.

Please refer to FIG. 2 which shows a flowchart of a method for managing and controlling a resource based on a time series database according to an embodiment of the present disclosure. The method may be applied to a computer device, such as a computer device for processing as described in the aforementioned embodiment of implementation environment. The method may include the following steps (210 to 230).

In step 210, metadata of a resource is acquired.

Metadata of a resource refers to an acquisition metric of the resource. For example, if the resource is a CPU memory of a computer, the metadata of the resource, i.e., the acquisition metric of the resource, may be a CPU 4.0 (the memory is 4.0 G); if the resource is a usage rate of the memory of the computer, the metadata may be cpu.busy 0.55 (the usage rate of the memory is 0.55); if the resource is an idle rate of the memory of the computer, the metadata may be memory.free.percent 0.71 (the idle rate of the memory is 0.71); if the resource is an idle rate of a magnetic disk of the computer, the metadata may be df.bytes.free. percent 0.34 (the idle rate of the magnetic disk is 0.34); and if the resource is cache usage of the computer, the metadata may be redis.memory.used 10.2 (the cache usage is 10.2 G).

Optionally, an acquisition terminal is mounted in the computer device for acquisition, and the acquisition terminal may acquire metadata and send the metadata to the computer device for processing, and the metadata is stored by a time series database running in the computer device for processing. The acquisition terminal is a client terminal which supports a variety of devices for data acquisition. The acquisition terminal may be obtained from secondary development of an existing monitoring program in a time series database ecology, or may be obtained by a developer writing and designing by himself or herself, which is not limited in the embodiments of the present disclosure. In actual applications, the acquisition terminal obtained from the secondary development of the monitoring program in the time series database ecology may be used in order to quickly access the metadata of different types or different devices. There are a variety of monitoring programs for different application scenarios in the time series database ecology, from which the developers may find monitoring programs that match application scenarios of their own, and then slightly modify the monitoring programs, that is, perform secondary development to adapt to the application scenarios of their own and become acquisition terminals in the application scenarios of their own.

In the embodiments of the present disclosure, an acquisition terminal of a computer device for acquisition may initiatively send metadata to a computer device for processing after acquiring the metadata, or may send the metadata to the computer device for processing when the computer device for processing makes an acquisition request. Optionally, the computer device for acquisition may send the metadata to the computer device for processing every preset time, or may send the metadata to the computer device for processing immediately when the metadata is acquired; the computer device for processing may acquire the metadata from the computer device for acquisition every preset time, or may acquire the metadata from the computer device for acquisition immediately when the metadata is acquired by the computer device for acquisition, which is not limited in the embodiments of the present disclosure.

In step 220, the metadata is aggregated according to an aggregation strategy to obtain aggregated metadata.

The aggregation strategy is configured to aggregate the metadata based on a data metric of the metadata. Optionally, the time series database running in the computer device for processing may aggregate the metadata according to a certain aggregation strategy to obtain the aggregated metadata, and may further store the aggregated metadata in the time series database. Optionally, there are a variety of aggregation functions in the time series database ecology, and the aggregation strategy may be formulated by the developers in combination with the aggregation function of the time series database and requirements for the actual application scenarios.

In the embodiments of the present disclosure, the computer device for processing obtains the aggregated metadata after aggregating the metadata. The aggregated metadata may be multiple data sets, each of which may be a type of metadata. Massive metadata may be aggregated into the multiple sets by aggregating the metadata, thereby realizing categorized storage of the metadata, and facilitating a quick retrieval of required metadata for analyzing and processing.

In step 230, the resource is managed and controlled in the time series database based on the aggregated metadata.

The computer device for processing may manage and control the resource after obtaining the aggregated metadata. For example, the aggregated metadata is used to generate a resource report of the resource for resource analyzing and processing. Optionally, if the processing overhead of the computer device is not taken into account, or in order to obtain more accurate and comprehensive analysis results, the computer device for processing may also manage and control the resource based on the metadata before processing, which is not limited in the embodiments of the present disclosure.

In a possible implementation, after the aforementioned step 210, the method further includes: determining whether the metadata is in a preset format; in the case that the metadata is not in the preset format, format conversion is performed on the metadata to obtain the metadata in the preset format, wherein the metadata in the preset format is configured to be aggregated to obtain the aggregated metadata.

In the embodiments of the present disclosure, since metadata is stored in a time series database running in a computer device for processing, and the metadata is also aggregated by the time series database, the format of the metadata shall meet a certain requirement, that is, the metadata shall be in a preset format, so as to facilitate reading and analyzing by the time series database. The preset format is a format of data that enables the time series database to read and analyze. For example, the preset format may be a key-value format. If the aforementioned acquisition terminal is obtained from the secondary development based on the monitoring program in the time series database ecology, the metadata acquired by the acquisition terminal is in the preset format, and it does not need to perform the format conversion on the metadata; if the aforementioned acquisition terminal is obtained by the developer writing and designing by himself or herself, the format may not be read or analyzed by the time series database. At this moment, it needs to perform the format conversion on the metadata, so as to convert the metadata into the metadata in the preset format.

In another possible implementation, after the aforementioned step 210, the method further includes: acquiring an extension strategy; performing information extension on the metadata according to the extension strategy to obtain extended metadata, wherein the extended metadata is configured to be aggregated to obtain the aggregated metadata.

After acquiring the metadata, the computer device for processing may perform the information extension on the metadata according to the extension strategy, and then the extended metadata may be used for being aggregated. In this way, business information extension may be performed on the metadata to facilitate in-depth analyzing and processing of resources. In the embodiments of the present disclosure, the extension strategy is configured to perform the information extension on a data tag of the metadata, wherein the data tag is configured to indicate attribute information of the metadata. Optionally, the metadata acquired by the computer device for processing is in the format of: metric, value, timestamp, and [<tag1:v1>,<tag2:v2>, . . . ]. The information extension on the metadata is to extend a tag of the extended metadata.

For example, the metadata initially acquired by the computer device for processing is as follows:
Cpu,4.0,1575970265,[<ip:127.0.0.1>,<idc:beijing>]; and
Cpu,8.0,1575970355,[<ip:127.1.0.0>,<idc:shenzhen>].

After acquiring the aforementioned metadata, the computer device for processing performs the information extension on the aforementioned metadata according to the requirements for the actual application scenarios and adds data tags of the metadata. For example, the computer device for processing adds usage environment and brand type of the resource corresponding to the metadata. Optionally, after the computer device for processing performs the information extension on the metadata, the extended metadata obtained is as follows:
Cpu,4.0,1575970265,[<ip:127.0.0.1>,<idc:beijing>,
 <env:prod>,<tra:lenovo>]; and
Cpu,8.0,1575970355,[<ip:127.1.0.0>,<idc:shenzhen>,
 <env:beta>,<tra:dell>].

In summary, the technical solution provided by the embodiments of the present disclosure provides a method for managing and controlling a resource based on a time series database by acquiring metadata of the resource, and then aggregating the metadata according to an aggregation strategy to obtain the aggregated metadata, and further managing and controlling the resource in the time series database based on the aggregated metadata. Moreover, in the embodiments of the present disclosure, the aggregated metadata may be multiple data sets, each of which may be a type of metadata, so that massive metadata may be aggregated into the multiple sets by aggregating the metadata in the embodiments of the present disclosure, thereby realizing categorized storage of the metadata, and facilitating a quick retrieval of required metadata for analyzing and processing. In addition, in the embodiments of the present disclosure, the method for managing and controlling the resource is applied to the time series database. Due to the fact that the time series database itself has the characteristics of high storage efficiency and strong portability, the efficiency of managing and controlling resources is improved, and the resources may also be managed differently to meet different needs.

In addition, in the technical solution provided by the embodiments of the present disclosure, format conversion is performed on metadata to obtain the metadata in a preset format when the metadata is not in the preset format; and then the metadata in the preset format is used for being aggregated to facilitate reading and analyzing of the metadata by the time series database.

In addition, in the technical solution provided by the embodiments of the present disclosure, information extension is performed on metadata according to a certain extension strategy to obtain extended metadata; and then the extended metadata is used for being aggregated, so that business information extension may be performed on the metadata to facilitate in-depth analyzing and processing of resources.

In a possible implementation, the aforementioned step 230 includes: invoking a resource managing and controlling model, and outputting a resource report corresponding to the resource based on the aggregated metadata.

The resource managing and controlling model is configured to establish a corresponding relationship between the metadata and the resource report. In the embodiments of the present disclosure, the resource managing and controlling model is reusable, that is, after the resource managing and controlling model is established, it no longer needs to re-establish a resource managing and controlling model when it needs to output the resource report next time. It only needs to use the established resource managing and controlling model. For example, if it needs to use the resource managing and controlling model to output a resource report every month, it only needs to establish a resource managing and controlling model in the first month. Every month after that, a resource report of the corresponding month may be automatically output by replacing the input metadata in the resource managing and controlling model. The embodiments of the present disclosure do not limit the specific forms of the resource managing and controlling models. Optionally, the resource managing and controlling model includes a resource managing function, a machine learning model, a deep learning model, a neural network model, and the like.

Exemplarily, when the form of the resource managing and controlling model is a resource managing function, dependent variables of the resource managing function include a resource report, and independent variables of the resource managing function include at least one of: a data source attribute, a metric type, a management dimension, and a report period.

The data source attribute refers to an invoker of the resource managing and controlling model, that is, a user who uses the resource managing and controlling model to output a resource report. For example, if a company has three departments, i.e., a business department, a research & development (R&D) department, and an operation department respectively, and the company has a resource managing and controlling model, i.e., a resource managing function, the data source attribute of the resource managing function, i.e., the invoker of the resource managing and controlling model, is the business department, the R&D department, and the operation department; the metric type (metric_type) refers to a type of the metadata, i.e., the metric of the metadata, such as df.bytes.free.percent, cpu.busy, memory.free.percent, redis.memory.used, and the like; the management dimension (manage tag) refers to a data tag of the metadata, i.e., the tag of the metadata, such as idc, env, tra, and the like; and the report period (interval) refers to a period of invoking the resource managing and controlling model, i.e., a period of using the resource managing and controlling model to output the resource report, for example, if the resource managing and controlling model is used to output the resource report once a month, the report period is one month.

Exemplarily, the specific form of the resource managing function may be as follows:

Func(source,[metric1,metric2, . . . ],interval,[<tag1:v1>, <tag2:v2>, . . . ], . . . ).

Exemplarily, if the aforementioned resource managing function is used, the output resource report may be as follows:

| source | metric | interval | value | tag1 | tag2 | tagn |
|---|---|---|---|---|---|---|
| Business department | cpu.busy | 2 months | value1 | idc | env | . . . |
| R&D department | cpu | 1 month | value2 | tra | env | . . . |
| Operation department | df.bytes.free.percent | 3 months | value3 | idc | tra | . . . |

In summary, the technical solution provided by the embodiments of the present disclosure provides a specific method for managing and controlling a resource based on a time series database by invoking a resource managing and controlling model and outputting a resource report corresponding to the resource based on the aggregated metadata. The resource managing and controlling model is reusable, which improves the efficiency of managing and controlling the resource. Moreover, in the technical solution provided by the embodiments of the present disclosure, the resource managing and controlling model includes a resource managing function, and a specific implementation method of the resource managing and controlling model is provided.

In a possible implementation, the aforementioned aggregation strategy includes a computational aggregation strategy, and the aforementioned step 220 includes: computing an expected value of the metadata according to the computational aggregation strategy; and taking the expected value as the data metric of the metadata to obtain the aggregated metadata.

The expected value is a value obtained by processing the data metric of the metadata according to the computational aggregation strategy. The computational aggregation strategy refers to aggregating values of the metadata with the same metrics. Optionally, the computational aggregation strategy includes: a logical aggregation, a statistical aggregation and a hybrid aggregation. The logical aggregation includes processing data metrics of the metadata, and taking the maximum or minimum value or the like of the data metrics of the metadata; the statistical aggregation includes processing data metrics of the metadata data, and taking an average value or a sum or the like of the data metrics of the metadata; and the hybrid aggregation includes a hybrid of the computational aggregation and the statistical aggregation.

For example, the usage rates of a memory of a computer may be acquired every 10 seconds, but now it needs to aggregate the acquired data to obtain the usages rate of the memory per minute. Assuming that the data metrics of the metadata initially acquired by the computer device for processing are: 30%, 50%, 60%, 20%, 45%, and 55%, then the data metrics of the metadata are computationally aggregated, i.e., the usage rates of the memory per minute of the computer are aggregated. The aggregation may be a logical aggregation, such as the aggregation of the maximum value, to obtain 60%; or a statistical aggregation, such as the aggregation of the average value, which is 43%; or a hybrid aggregation. Optionally, different computational aggregation strategies are selected in actual applications according to different business requirements.

In another possible implementation, the aforementioned aggregation strategy includes a dimensional aggregation strategy; and the aforementioned step 220 includes: categorizing the metadata according to the dimensional aggregation strategy to obtain m types of metadata, wherein m is a positive integer; for an $n^{th}$ type of metadata in the m types of metadata, aggregating data metrics of the $n^{th}$ type of metadata, wherein n is a positive integer; and taking an aggregated data metrics as the data metric of the $n^{th}$ type of metadata to obtain the aggregated metadata.

The dimensional aggregation strategy refers to an aggregation on the data metrics of the metadata of the same type based on the data tags of the metadata. The computer device for processing categorizes the metadata based on the data tags at first, and then aggregates the data metrics of each type of metadata according to the dimensional aggregation strategy.

For example, when information extension is performed on the metadata obtained by acquiring usage rates of a memory of a computer, a data tag of brand may be added. When the usage rates of the memory of the computer are aggregated by the computer device for processing according to the dimensional aggregation strategy, the metadata of the same brand may be aggregated together at first based on the data tag of brand. For example, the metadata of Lenovo is aggregated together, and the metadata of Dell is aggregated together. And then, the data metrics on the metadata of each brand are aggregated. For example, for the metadata of Lenovo, the usage rates of the memory of all metadata are aggregated, and for the metadata of Dell, the usage rates of the memory of all metadata are aggregated.

In yet another possible implementation, the aggregation strategy further includes a hybrid aggregation strategy, and the hybrid aggregation strategy is a hybrid of the computational aggregation strategy and the dimensional aggregation strategy.

In summary, in the technical solutions provided by the embodiments of the present disclosure, the aggregation strategy includes a computational aggregation strategy, a dimensional aggregation strategy, and a hybrid aggregation strategy. The metadata is aggregated by the computational, the dimensional or the hybrid aggregation strategy to obtain the aggregated metadata, and a specific implementation method of aggregating is provided.

Figure 3:
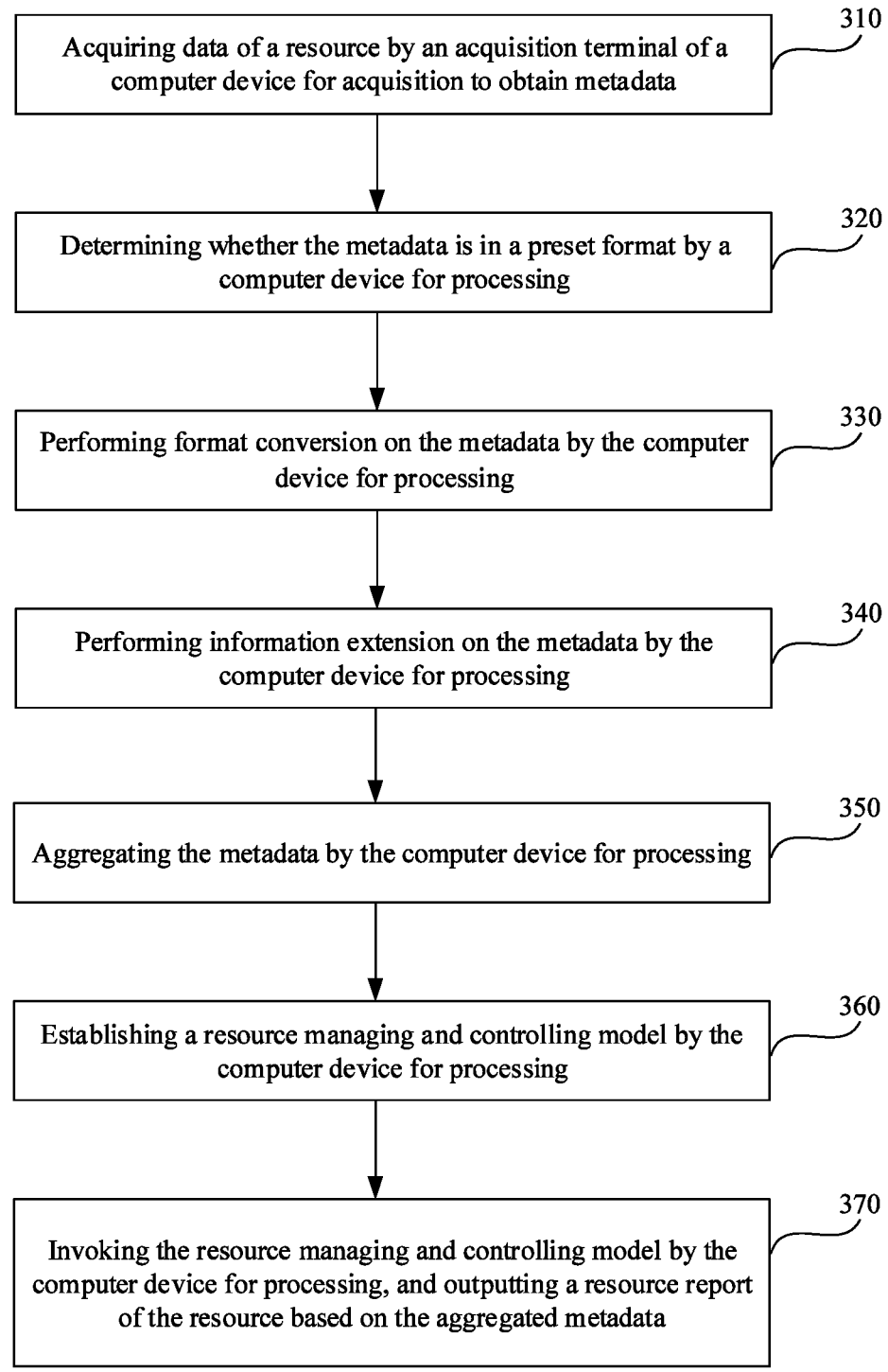
FIG. 3 is a flowchart of a method for managing and controlling a resource based on a time series database according to another embodiment of the present disclosure.

Please refer to FIG. 3 which shows a flowchart of a method for managing and controlling a resource based on a time series database according to an embodiment of the present disclosure. The method may be applied to a computer device. The method may include the following steps (310 to 370):

in step 310, an acquisition terminal of a computer device for acquisition acquires data of a resource to obtain metadata; and the acquisition terminal is mounted in the computer device for acquisition, and the acquisition terminal may acquire metadata and send the metadata to a computer device for processing, and the metadata is stored by a time series database running in the computer device for processing;

in step 320, the computer device for processing determines whether the metadata is in a preset format; if yes, perform the following step 340; if no, perform the following step 330; due to the facts that metadata is stored in the time series database running in the computer device for processing, and that the metadata is also aggregated by the time series database, the format of the metadata shall meet a certain requirement, that is, the metadata shall be in a preset format, so as to facilitate reading and analyzing by the time series database;

in step 330, format conversion is performed on the metadata by the computer device for processing; if the acquisition terminal described above is obtained by the developer writing and designing by himself or herself, the format may not be read or analyzed by the time series database. At this moment, it needs to perform the format conversion on the metadata, so as to convert the metadata into the metadata in the preset format;

in step 340, information extension is performed on the metadata by the computer device for processing; in the embodiments of the present disclosure, the computer device for processing performs the information extension on data tags of the metadata according to the extension strategy, wherein the data tag is configured to indicate attribute information of the metadata, so as to facilitate in-depth analyzing and processing of resources by extending the data tags of the metadata;

in step 350, the metadata is aggregated by the computer device for processing; and the metadata is aggregated according to a certain aggregation strategy by the times series database running in the computer device for processing to obtain the aggregated metadata and the aggregated metadata is further stored in the time series database;

in step 360, a resource managing and controlling model is established by the computer device for processing; when the resource managing and controlling model is used for the first time to output a resource report, the computer device for processing needs to establish a resource managing and controlling model, and the resource managing and controlling model is reusable, that is, it may be directly used when outputting the resource report next time, thus improving the efficiency of managing and controlling resources; and in step 370, the resource managing and controlling model is invoked by the computer device for processing, and a resource report of the resource is output based on the aggregated metadata.

The following is an apparatus embodiment of the present disclosure, which may be used to implement the method embodiments of the present disclosure. For details not disclosed in the apparatus embodiment of the present disclosure, please refer to the method embodiments of the present disclosure.

Figure 4:
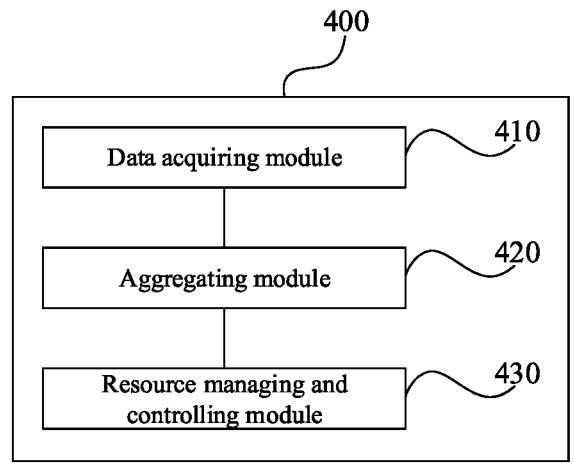
FIG. 4 is a block diagram of an apparatus for managing and controlling a resource based on a time series database according to an embodiment of the present disclosure.

Please refer to FIG. 4 which shows a block diagram of an apparatus for managing and controlling a resource based on a time series database according to an embodiment of the present disclosure. The apparatus 400 has a function of implementing the aforementioned method embodiments, and the function may be implemented by hardware, or by executing corresponding software by hardware. The apparatus 400 may be a computer device introduced above. The apparatus 400 may include: a data acquiring module 410, an aggregating module 420, and a resource managing and controlling module 430.

The data acquiring module 410 is configured to acquire metadata of the resource, and the metadata refers to an acquisition metric of the resource.

The aggregating module 420 is configured to aggregate the metadata according to an aggregation strategy to obtain aggregated metadata, and the aggregation strategy is configured to aggregate the metadata based on a data metric of the metadata.

The resource managing and controlling module 430 is configured to manage and control the resource in a time series database based on the aggregated metadata.

Optionally, the resource managing and controlling module 430 is configured to invoke a resource managing and controlling model, and to output a resource report corresponding to the resource based on the aggregated metadata, wherein the resource managing and controlling model is configured to establish a corresponding relationship between the metadata and the resource report.

Optionally, the resource managing and controlling model includes a resource managing function; dependent variables of the resource managing function include the resource report, and independent variables of the resource managing function include at least one of: a data source attribute, a metric type, a management dimension and a report period, wherein the data source attribute refers to an invoker of the resource managing and controlling model, the metric type refers to a type of the metadata, the management dimension refers to a data tag of the metadata, and the report period refers to a period of invoking the resource managing and controlling model.

Figure 5:
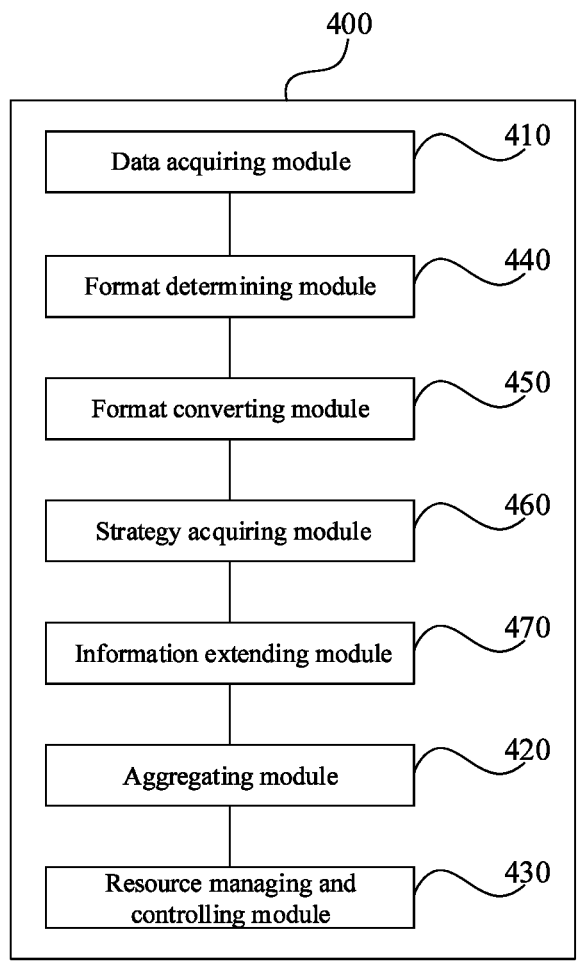
FIG. 5 is a block diagram of an apparatus for managing and controlling a resource based on a time series database according to another embodiment of the present disclosure.

Optionally, as shown in FIG. 5, the apparatus 400 further includes: a format determining module 440, configured to determine whether the metadata is in a preset format; and a format converting module 450, configured to perform format conversion on the metadata to obtain the metadata in the preset format in the case that the metadata is not in the preset format, wherein the metadata in the preset format is configured to be aggregated to obtain the aggregated metadata.

Optionally, as shown in FIG. 5, the apparatus 400 further includes: a strategy acquiring module 460, configured to acquire an extension strategy which is configured to perform information extension on a data tag of the metadata, wherein the data tag is configured to indicate attribute information of the metadata; and an information extending module 470, configured to perform the information extension on the metadata according to the extension strategy to obtain extended metadata, wherein the extended metadata is configured to be aggregated to obtain the aggregated metadata.

Optionally, the aggregation strategy includes a computational aggregation strategy; and the aggregating module 420 is configured to: compute an expected value of the metadata according to the computational aggregation strategy, wherein the expected value is a value obtained by processing the data metric of the metadata according to the computational aggregation strategy; and take the expected value as the data metric of the metadata to obtain the aggregated metadata.

Optionally, the aggregation strategy includes a dimensional aggregation strategy; and the aggregating module 420 is configured to: categorize the metadata according to the dimensional aggregation strategy to obtain m types of metadata, wherein m is a positive integer; for an $n^{th}$ type of metadata in the m types of metadata, aggregate data metrics of the $n^{th}$ type of metadata, wherein n is a positive integer; and take an aggregated data metric as the data metric of the $n^{th}$ type of metadata to obtain the aggregated metadata.

In summary, the technical solution provided by the embodiments of the present disclosure provides a method for managing and controlling a resource based on a time series database by acquiring metadata of the resource, and then aggregating the metadata according to an aggregation strategy to obtain the aggregated metadata, and further managing and controlling the resource based on the aggregated metadata. Moreover, in the embodiments of the present disclosure, the aggregated metadata may be multiple data sets, each of which may be a type of metadata, so that massive metadata may be aggregated into the multiple sets by aggregating the metadata in the embodiments of the present disclosure, thereby realizing categorized storage of the metadata, and facilitating a quick retrieval of required metadata for analyzing and processing. In addition, in the embodiments of the present disclosure, the method for managing and controlling the resource is applied to the time series database. Due to the fact that the time series database itself has the characteristics of high storage efficiency and strong portability, the efficiency of managing and controlling resources is improved, and the resources may also be managed differently to meet different needs.

In addition, in the technical solution provided by the embodiments of the present disclosure, format conversion is performed on metadata to obtain the metadata in a preset format when the metadata is not in the preset format; and then the metadata in the preset format is used for being aggregated to facilitate reading and analyzing of the metadata by the time series database.

In addition, in the technical solution provided by the embodiments of the present disclosure, information extension is performed on metadata according to a certain extension strategy to obtain extended metadata; and then the extended metadata is used for being aggregated, so that business information extension may be performed on the metadata to facilitate in-depth analyzing and processing of resources.

It should be noted that the apparatus provided by the embodiments of the present disclosure is only illustrated by taking the division of the aforementioned functional modules as an example, when the functions of the apparatus are implemented. In actual applications, the aforementioned functions may be completed by being allocated to different functional modules as required, i.e., the internal structure of the apparatus is divided into different functional modules to complete all or part of the functions described above. In addition, the apparatus and method embodiments provided by the above embodiments belong to the same concept, and the specific implementation process is detailed in the method embodiments, which will not be repeated herein.

Figure 6:
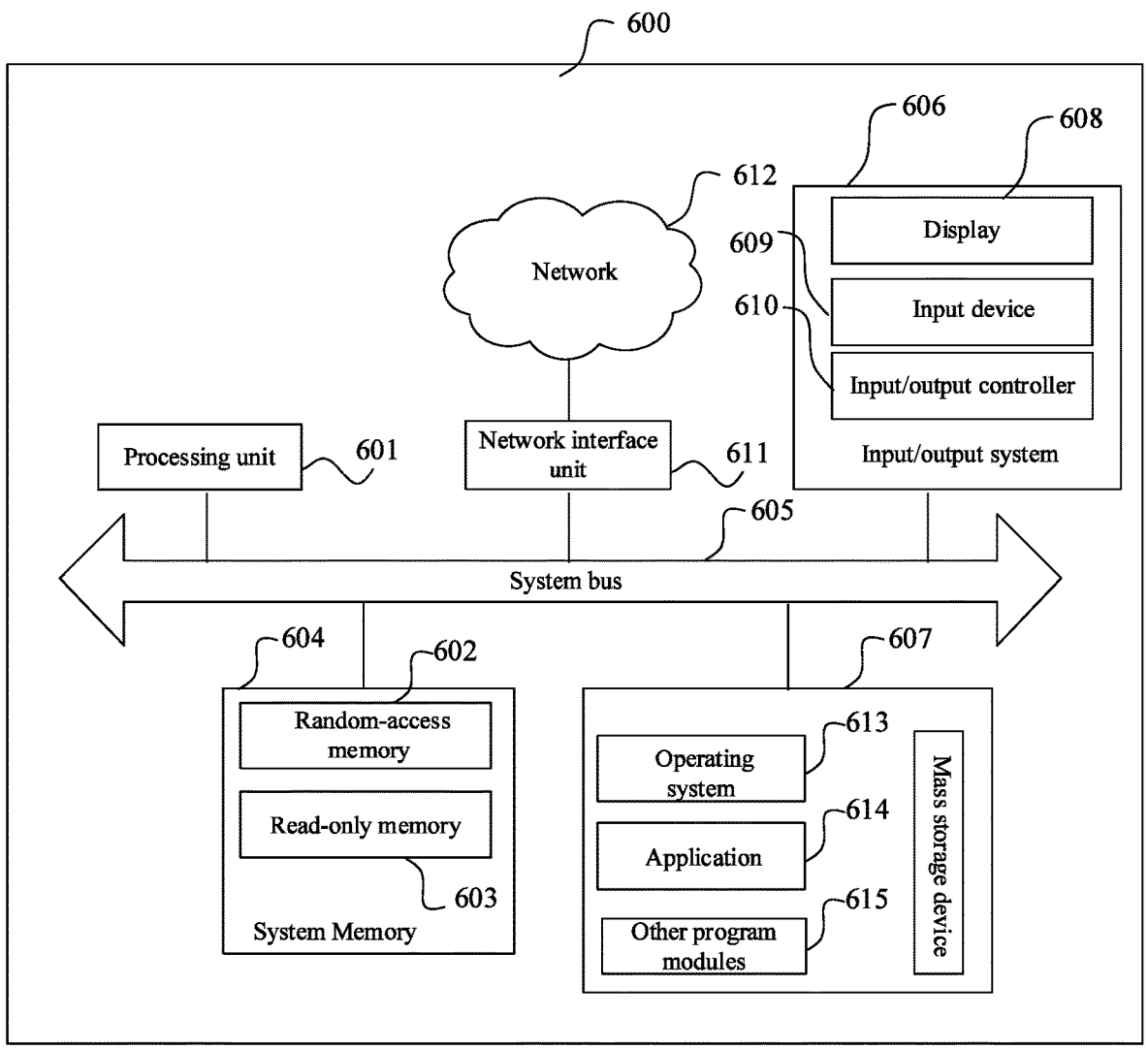
FIG. 6 is a structural block diagram of a computer device according to an embodiment of the present disclosure.

Please refer to FIG. 6 which shows a structural block diagram of a computer device according to an embodiment of the present disclosure. The computer device may be configured to implement the method for managing and controlling a resource based on a time series database according to the aforementioned embodiments. For example, the computer device may be a computer device for processing in the implementation environment shown in FIG. 1. Specifically, the computer device 600 includes a processing unit (such as a central processing unit (CPU), a graphics processing unit (GPU), a field programmable gate array (FPGA), and the like) 601, a system memory 604 including a random-access memory (RAM) 602 and a read-only memory (ROM) 603, and a system bus 605 connecting the system memory 604 and the central processing unit 601. The computer device 600 further includes an input/output system (I/O system, basic input/output system) 606 that helps information transmission among various components within a server, and a mass storage device 607 for storing an operating system 613, an application 614 and other program modules 615.

The I/O system 606 includes a display 608 for displaying information and an input device 609 such as a mouse, a keyboard, and the like, for inputting information by a user. The display 608 and the input device 609 are both connected to the central processing unit 601 by an input/output controller 610 connected to the system bus 605. The I/O system 606 may further include the input/output controller 610 for receiving and processing input from a plurality of other devices, such as a keyboard, a mouse, or an electronic stylus. Similarly, the input/output controller 610 further provides output to a display screen, a printer or others types of output devices.

The mass storage device 607 is connected to the central processing unit 601 by a mass storage controller (not shown) connected to the system bus 605. The mass storage device 607 and its associated computer-readable medium provide non-volatile storage for the computer device 600. In other words, the mass storage device 607 may include a computer-readable medium (not shown), such as a hard disk or a drive, or a compact disc read-only memory (CD-ROM).

Without loss of generality, the computer-readable medium may include a computer storage medium and a communication medium. The computer storage medium includes volatile and non-volatile medium, removable and non-removable media implemented in any method or technology for storage of information such as computer-readable instructions, data structures, program modules, or other data. The computer storage medium includes an RAM, an ROM, an erasable programmable read-only memory (EPROM), an electrically erasable programmable read-only memory (EEPROM), a flash memory or other solid-state storage technologies, a CD-ROM, a digital video disc (DVD) or other optical storage, a tape cassette, a magnetic tape, a magnetic disk storage or other magnetic storage devices. Of course, those skilled in the art may know that the computer storage medium is not limited to the aforementioned types. The aforementioned system memory 604 and the mass storage device 607 may be collectively referred to as the memory.

According to the embodiments of the present disclosure, the computer device 600 may also be operated by being connected through a network such as the Internet to a remote computer on the network. That is, the computer device 600 may be connected to the network 612 by a network interface unit 611 connected to the system bus 605, or that is, the computer device 600 may also connected to other types of networks or remote computer systems (not shown) by using the network interface unit 611.

The memory further includes a computer program which is stored in the memory and configured to be executed by one or more processors and to causes the one or more processors to implement the method for managing and controlling the resource based on the time series database.

In an embodiment of the present disclosure, a non-transitory computer-readable storage medium is further provided, wherein the non-transitory computer-readable storage medium stores thereon a computer program, wherein the computer program, when executed by a processor, causes the processor to implement the method for managing and controlling the resource based on the time series database.

In an exemplary embodiment of the present disclosure, a computer program product is further provided, wherein the computer program product, when executed by a processor, is configured to cause the processor to implement the method for managing and controlling the resource based on the time series database.

It should be understood that "multiple" mentioned herein refers to two or more. "And/or" describes an association relationship of the associated objects, indicating that there may be three relationships, for example, A and/or B, which may refer to as: A exists alone, A and B exist simultaneously, B exists alone. The character "I" generally indicates that the contextual objects are in an "or" relationship.

The above descriptions are merely exemplary embodiments of the present disclosure, and are not used to limit the present disclosure. Any modifications, equivalent substitutions or improvements that are made within the spirit and principle of the present disclosure should all be contained in the protection scope of the present disclosure.

What is claimed is:

1. A method for managing and controlling a resource based on a time series database, the method comprising:
   acquiring metadata of a resource, the metadata referring to an acquisition metric of the resource;
   aggregating the metadata according to an aggregation strategy to obtain aggregated metadata, the aggregation strategy being configured to aggregate the metadata based on a data metric of the metadata;
   invoking a resource managing and controlling model;
   outputting a resource report corresponding to the resource based on the aggregated metadata, the resource managing and controlling model being configured to establish a corresponding relationship between the metadata and the resource report, wherein the resource managing and controlling model comprises a resource managing function, wherein dependent variables of the resource managing function comprise the resource report, and wherein independent variables of the resource managing function comprise: a data source attribute, a metric type, a management dimension, and a report period, wherein the data source attribute refers to an invoker of the resource managing and controlling model, the metric type refers to a type of the metadata, the management dimension refers to a data tag of the metadata, and the report period refers to a period of invoking the resource managing and controlling model; and
   wherein the resource report comprises a table that comprises:
   a data source column;
   a metric type column;
   a management dimension column; and
   a report period column.

2. The method according to claim 1, wherein after acquiring the metadata of the resource, the method further comprises:
   determining whether the metadata is in a preset format; and
   performing format conversion on the metadata to obtain the metadata in the preset format in the case that the metadata is not in the preset format, wherein the metadata in the preset format is configured to be aggregated to obtain the aggregated metadata.

3. The method according to claim 1, wherein after acquiring the metadata of the resource, the method further comprises:
   acquiring an extension strategy which is configured to perform information extension on a data tag of the metadata, the data tag being configured to indicate attribute information of the metadata; and
   performing the information extension on the metadata according to the extension strategy to obtain extended metadata, wherein the extended metadata is configured to be aggregated to obtain the aggregated metadata.

4. The method according to claim 1, wherein the aggregation strategy comprises a computational aggregation strategy; and
   wherein aggregating the metadata according to the aggregation strategy to obtain the aggregated metadata comprises:
      computing an expected value of the metadata according to the computational aggregation strategy, the expected value being a value obtained by processing the data metric of the metadata according to the computational aggregation strategy; and
      taking the expected value as the data metric of the metadata to obtain the aggregated metadata.

5. The method according to claim 1, wherein the aggregation strategy comprises a dimensional aggregation strategy; and
   wherein aggregating the metadata according to the aggregation strategy to obtain the aggregated metadata comprises:
      categorizing the metadata according to the dimensional aggregation strategy to obtain m types of metadata, m being a positive integer;
      for an $n^{th}$ type of metadata in the m types of metadata, aggregating data metrics of the $n^{th}$ type of metadata, n being a positive integer; and
      taking an aggregated data metric as the data metric of the $n^{th}$ type of metadata to obtain the aggregated metadata.

6. A computing device for managing and controlling a resource, the computing device comprising:
   a data acquiring module, configured to acquire metadata of a resource, the metadata referring to an acquisition metric of the resource;
   an aggregating module, configured to aggregate the metadata according to an aggregation strategy to obtain aggregated metadata, the aggregation strategy being configured to aggregate the metadata based on a data metric of the metadata; and
   a resource managing and controlling module, configured to:
      invoke a resource managing and controlling model; and
      outputting a resource report corresponding to the resource based on the aggregated metadata, the resource managing and controlling model being configured to establish a corresponding relationship between the metadata and the resource report, wherein the resource managing and controlling model comprises a resource managing function, wherein dependent variables of the resource managing function comprise the resource report, and wherein independent variables of the resource managing function comprise: a data source attribute, a metric type, a management dimension, and a report period, wherein the data source attribute refers to an invoker of the resource managing and controlling model, the metric type refers to a type of the metadata, the management dimension refers to a data tag of the metadata, and the report period refers to a period of invoking the resource managing and controlling model; and
   wherein the resource report comprises a table comprising:
      a data source column;
      a metric type column;
      a management dimension column; and
      a report period column.

7. A computer device, comprising:
   a processor; and
   a memory, wherein the memory stores therein a computer program that, when loaded and executed by the processor, causes the processor to implement a method comprising:
      acquiring metadata of a resource, the metadata referring to an acquisition metric of the resource;
      aggregating the metadata according to an aggregation strategy to obtain aggregated metadata, the aggregation strategy being configured to aggregate the metadata based on a data metric of the metadata;
      invoking a resource managing and controlling model;
      outputting a resource report corresponding to the resource based on the aggregated metadata, the resource managing and controlling model being configured to establish a corresponding relationship between the metadata and the resource report, wherein the resource managing and controlling model comprises a resource managing function, wherein dependent variables of the resource managing function comprise the resource report, and wherein independent variables of the resource managing function comprise: a data source attribute, a metric type, a management dimension, and a report period, wherein the data source attribute refers to an invoker of the resource managing and controlling model, the metric type refers to a type of the metadata, the management dimension refers to a data tag of the metadata, and the report period refers to a period of invoking the resource managing and controlling model; and
   wherein the resource report comprises a table comprising:
      a data source column;
      a metric type column;
      a management dimension column; and
      a report period column.

8. A non-transitory computer-readable storage medium, storing thereon a computer program, wherein the computer program, when executed by a processor, causes the processor to implement a method comprising:
   acquiring metadata of a resource, the metadata referring to an acquisition metric of the resource;
   aggregating the metadata according to an aggregation strategy to obtain aggregated metadata, the aggregation strategy being configured to aggregate the metadata based on a data metric of the metadata;

invoking a resource managing and controlling model;

outputting a resource report corresponding to the resource based on the aggregated metadata, the resource managing and controlling model being configured to establish a corresponding relationship between the metadata and the resource report, wherein the resource managing and controlling model comprises a resource managing function, wherein dependent variables of the resource managing function comprise the resource report, and wherein independent variables of the resource managing function comprise: a data source attribute, a metric type, a management dimension, and a report period, wherein the data source attribute refers to an invoker of the resource managing and controlling model, the metric type refers to a type of the metadata, the management dimension refers to a data tag of the metadata, and the report period refers to a period of invoking the resource managing and controlling model; and wherein the resource report comprises a table comprising:

a data source column;
a metric type column;
a management dimension column; and
a report period column.

* * * * *